(12) United States Patent
Chuang

(10) Patent No.: US 8,276,492 B1
(45) Date of Patent: Oct. 2, 2012

(54) ANGLE ADJUSTMENT STRUCTURE OF A HYDRAULIC CUT-OFF PRESS

(76) Inventor: Sen-Jung Chuang, Tan Shui Chen (TW)

( * ) Notice: Subject to any disclaimer, the term of this patent is extended or adjusted under 35 U.S.C. 154(b) by 521 days.

(21) Appl. No.: 12/643,122

(22) Filed: Dec. 21, 2009

(51) Int. Cl.
*B26D 9/00* (2006.01)

(52) U.S. Cl. .................................. 83/518; 83/581
(58) Field of Classification Search ............. 83/34, 35, 83/581, 518
See application file for complete search history.

(56) References Cited

U.S. PATENT DOCUMENTS

| | | | |
|---|---|---|---|
| 2,107,174 A * | 2/1938 | Boice | 144/250.18 |
| 3,239,169 A * | 3/1966 | Sloyan | 248/656 |
| 3,368,596 A * | 2/1968 | Comer | 83/473 |
| 6,378,348 B1 * | 4/2002 | Katsube | 72/312 |
| 6,474,125 B1 * | 11/2002 | Denis et al. | 72/306 |
| 7,243,518 B1 * | 7/2007 | Chuang | 72/129 |
| 7,267,038 B2 * | 9/2007 | Parks et al. | 83/473 |
| 2006/0104731 A1 * | 5/2006 | Etter et al. | 408/16 |
| 2009/0178530 A1 * | 7/2009 | Osgood | 83/522.26 |

* cited by examiner

*Primary Examiner* — Sean Michalski
(74) *Attorney, Agent, or Firm* — Jackson IPG PLLC

(57) ABSTRACT

An angle adjustment structure installed in a hydraulic cut-off press between a worktable and a machine base for adjusting the angular position of the worktable relative to the machine base is disclosed to have arched rails fixedly symmetrically provided at two opposite upright peripheral walls of the worktable at the bottom side, arched sliding grooves respectively formed in two opposite upright peripheral walls of the machine base at the top side for supporting the arched rails, a worm pivotally mounted in the machine base, and an arched worm gear fixedly mounted in the worktable at the bottom side and meshed with the worm for moving the worktable relative to the machine base along the arched sliding grooves upright rotation of the worm to adjust the angular position of the worktable by an external biasing force.

5 Claims, 6 Drawing Sheets

ANGLE ADJUSTMENT STRUCTURE OF A HYDRAULIC CUT-OFF PRESS

BACKGROUND AND SUMMARY OF THE INVENTION

The present invention relates to a hydraulic cut-off press for cutting metal sheet members and more specifically, to an angle adjustment structure used in a hydraulic cut-off press for adjusting the angular position of the worktable.

A hydraulic cut-off press may be used in a metal processing machine for cutting the processed metal product such as U-shaped steel product, Z-shaped steel product, corrugated metal sheet product, or enameled metal tile product. As shown in FIG. 1, the processed metal product delivered from the metal processing machine 9 to the worktable 921 of a hydraulic cut-off press 92 for cutting by the cutting die 9211 at the worktable 921 subject to the desired length. The lead-out height and angle of the processed metal product must fit the position of the worktable 921 of the hydraulic cut-off press 92 so that the processed metal product can be cut accurately. If the lead-out angle of the processed metal product does not fit the position of the worktable 921 of the hydraulic cut-off press 92, the operator may be unable to perform the cutting operation smoothly.

The present invention has been accomplished under the circumstances in view. It is therefore the main object of the present invention to provide an angle adjustment structure for use in a hydraulic cut-off press, which enables the operator to conveniently adjust the angular position of the worktable of the hydraulic cut-off press. It is another object of the present invention to provide an angle adjustment structure for use in a hydraulic cut-off press, which does not require an additional external installation space. It is still another object of the present invention to provide an angle adjustment structure for use in a hydraulic cut-off press, which can be operated by hand or by a motor drive.

According to one aspect of the present invention, the angle adjustment structure is installed in a hydraulic cut-off press between a worktable and a machine base for adjusting the angular position of the worktable relative to the machine base, comprising a plurality of arched rails fixedly symmetrically provided at two opposite upright peripheral walls of the worktable at the bottom side, a plurality of arched sliding grooves respectively formed in two opposite upright peripheral walls of the machine base at the top side for supporting the arched rails, a worm pivotally mounted in the machine base, and an arched worm gear fixedly mounted in the worktable at the bottom side and meshed with the worm for moving the worktable relative to the machine base along the arched sliding grooves upright rotation of the worm to adjust the angular position of the worktable by an external biasing force. According to another aspect of the present invention, the worm has a worm shaft terminating in a coupling portion for driving manually through a hand tool or automatically by a motor drive.

DETAILED DESCRIPTION OF THE INVENTION

Figure 1:
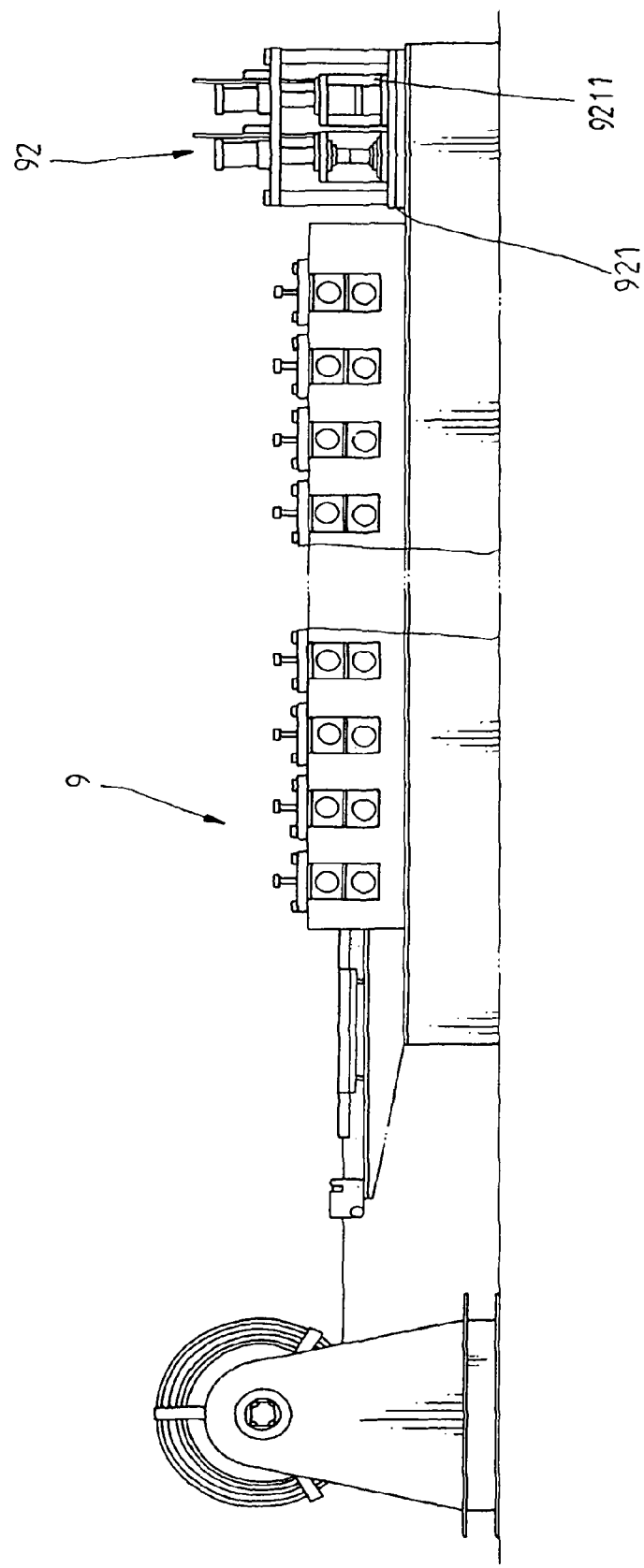
FIG. 1 is a plain view showing a hydraulic cut-off press installed in the rear side of a metal processing machine according to the prior art.
Figure 2:
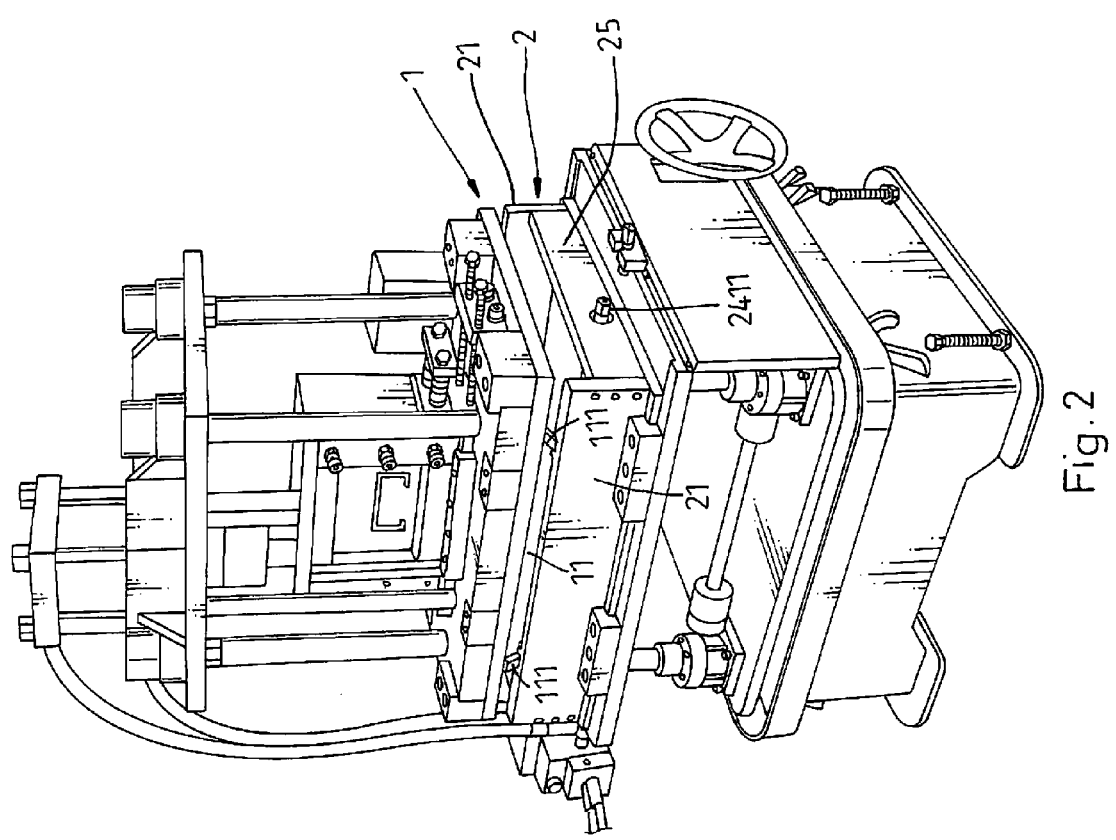
FIG. 2 is a perspective view of a hydraulic cut-off press constructed according to the present invention.
Figure 3:
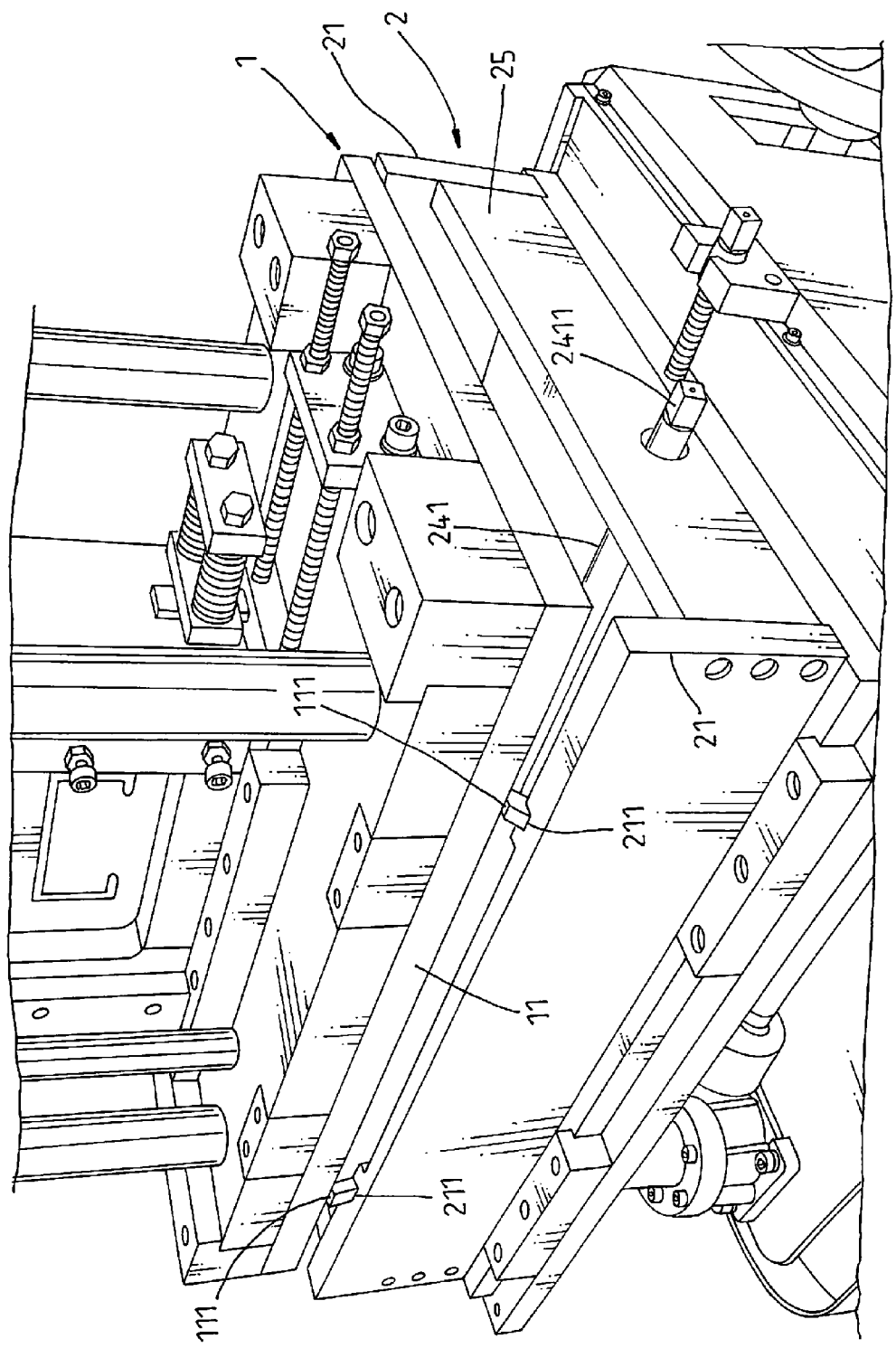
FIG. 3 is an enlarged view of a part of the hydraulic cut-off press according to the present invention.
Figure 4:
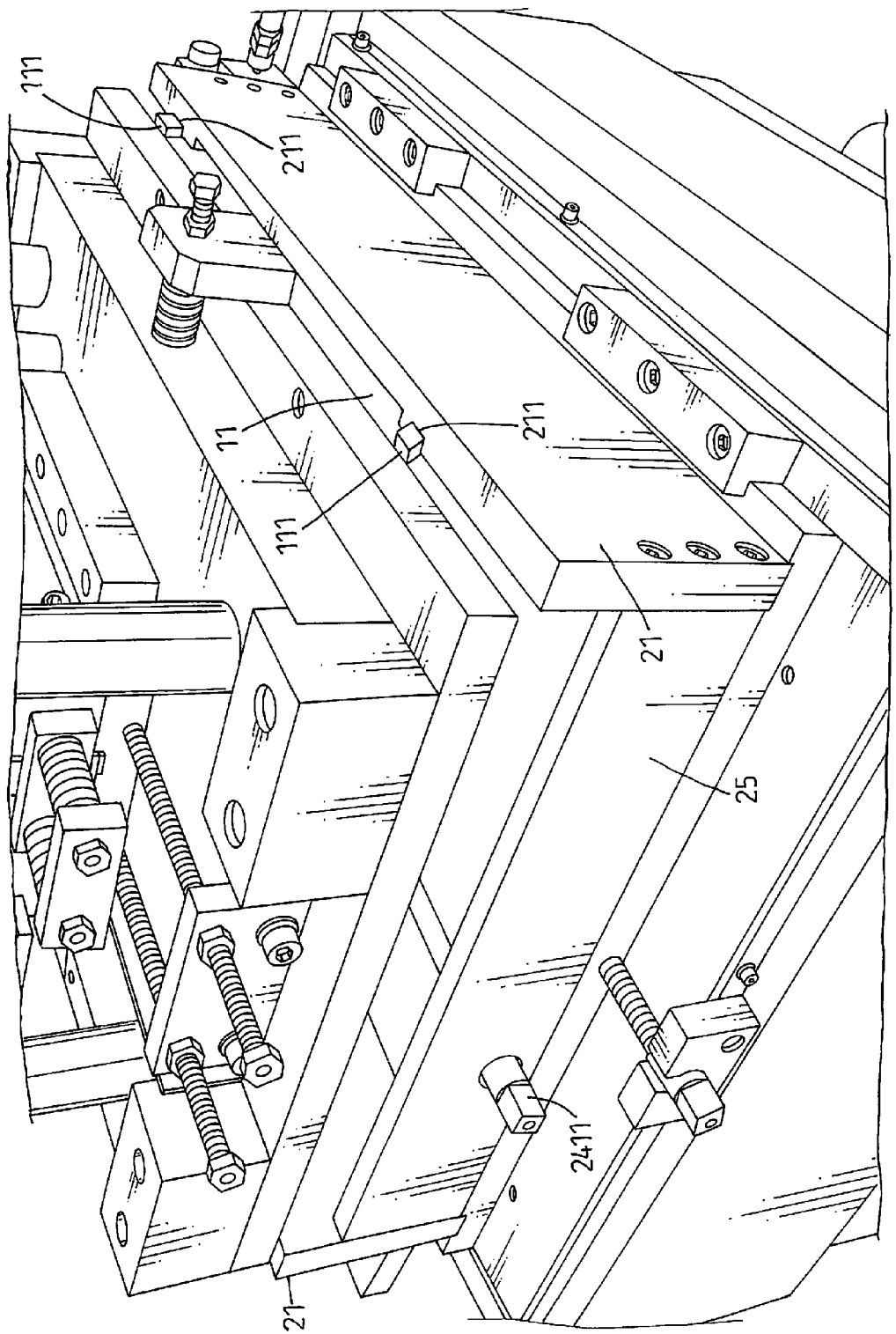
FIG. 4 corresponds to FIG. 3 but viewed from another angle.
Figure 5:
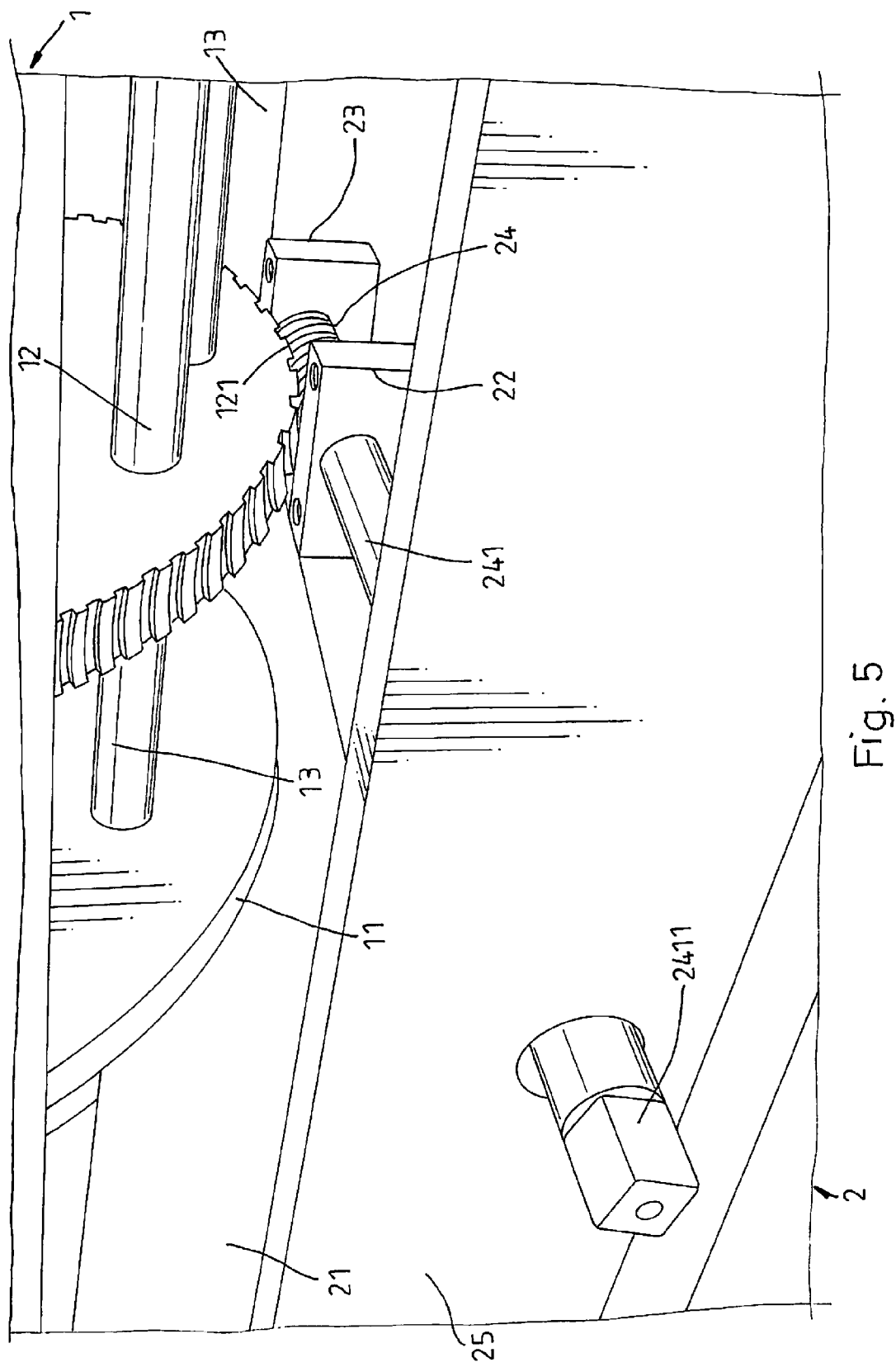
FIG. 5 is an enlarged view of another part of the hydraulic cut-off press according to the present invention.
Figure 6:
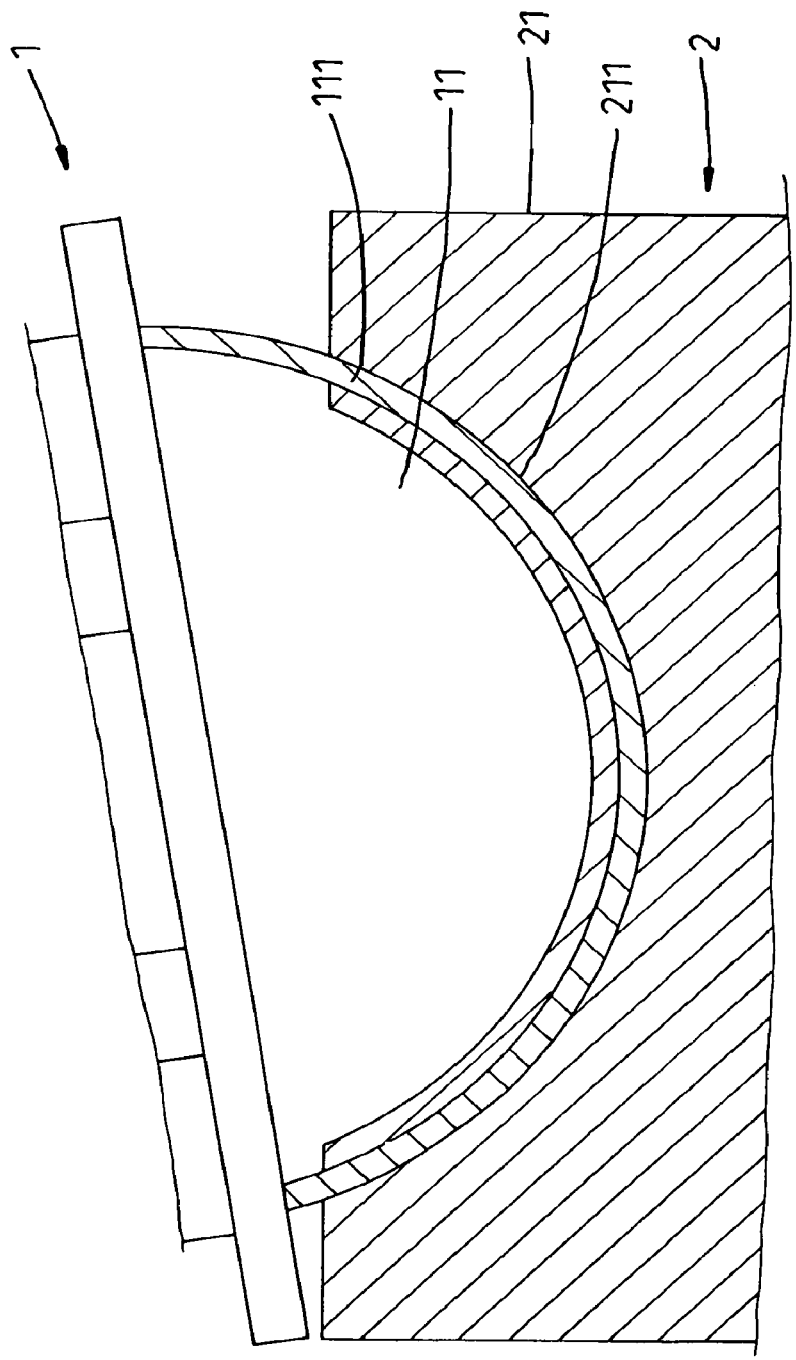
FIG. 6 is a schematic sectional view of a part of FIG. 5 after an adjustment of the angular position of the worktable.

Referring to FIGS. 2~6, a hydraulic cut-off press is shown comprising a machine base 2 and a worktable 1 above the machine base 2. The worktable 1 comprises a plurality of arched bottom rails 111 symmetrically provided at the bottom side of two opposite upright peripheral walls 11 thereof (see FIGS. 3, 4 and 6) and respectively supported in respective arched sliding grooves 211 at the top of two opposite upright peripheral walls 21 of the machine base 2. The machine base 2 comprises pairs of supports 22 and 23 arranged in parallel between the upright peripheral walls 21 to support a worm 24 (see FIG. 5). The worm 24 is meshed with the teeth 121 of at least one arched worm gear 12, which is fixedly fastened to the bottom side of the worktable 1. The worm shaft 241 of the worm 24 has one end terminating at a coupling portion 2411, which extends out of another upright peripheral wall 25 of the machine base 2 for receiving a wrench or the like that is used to rotate the worm 24. A hand wheel or crank handle may be used and attached to the coupling portion 2411 for turning the worm 24 by hand with less effort. Alternatively, a motor drive (not shown) may be installed in the machine base 2 and coupled to the coupling portion 2411 through transmission means (not shown) for turning the worm 24 electrically. When rotating the worm 24, the arched worm gear 12 is moved, thereby causing the arched bottom rails 111 to move with worktable 1 along the arched sliding grooves 211, and therefore the angular position of the worktable 1 is relatively adjusted.

Further, reinforcing bars 13 are connected between the two opposite upright peripheral walls 11 of the worktable 1 and fastened to the at least one arched worm gear 12 to reinforce the structural strength of the at least one arched worm gear 12 and the worktable 1.

As indicated above, the invention has the following features:

1. The worktable 1 has fixed arched bottom rails 111 disposed at the bottom of two opposite upright peripheral walls 11 thereof and respectively supported in the respective arched sliding grooves 211 at the top of two opposite upright peripheral walls 21 of the machine base 2 so that the worktable 1 can be turned relative to the machine base 2 along the arched sliding grooves 211 to change the angular position.

2. The whole angle adjustment structure is simple and does not require an additional external installation space.

3. The shaft 241 of the worm 24 has one end terminating in a coupling portion 2411 for driving manually through a hand tool or automatically by a motor drive.

What is claimed is:

1. An angle adjustment structure installed in a hydraulic cut-off press between a worktable and a machine base for adjusting the angular position of the worktable relative to the machine base, the angle adjustment structure comprising:
   a) two arched rails, one of the two arched rails is fixed to a bottom side of each of two opposing upright peripheral walls of the worktable;
   b) two arched sliding grooves, one of the two arched sliding grooves is formed in each of two opposing upright peripheral walls of the machine base, one of the two arched rails is slidably located in each of the two arched sliding grooves;

c) a worm rotatably mounted in the machine base; and d) at least one worm gear fixedly connected to a bottom of the worktable between the two opposing upright peripheral walls and engaging the worm, wherein the worm controlling a movement of the at least one worm gear and selectively adjusting the worktable relative to the machine base.

2. The angle adjustment structure according to claim 1, wherein the worm has a shaft having an end extending outwardly from a peripheral side wall of the machine base.

3. The angle adjustment structure according to claim 2, wherein the shaft has a coupling portion located on the end thereof.

4. The angle adjustment structure according to claim 2, wherein the peripheral side wall of the machine base is located between the two opposing upright peripheral walls of the machine base.

5. The angle adjustment structure according to claim 1, further comprising a plurality of reinforcing bars, one of the plurality of reinforcing bars is located between the at least one worm gear and each of the two opposing upright peripheral walls of the worktable.

* * * * *